Figure 1:
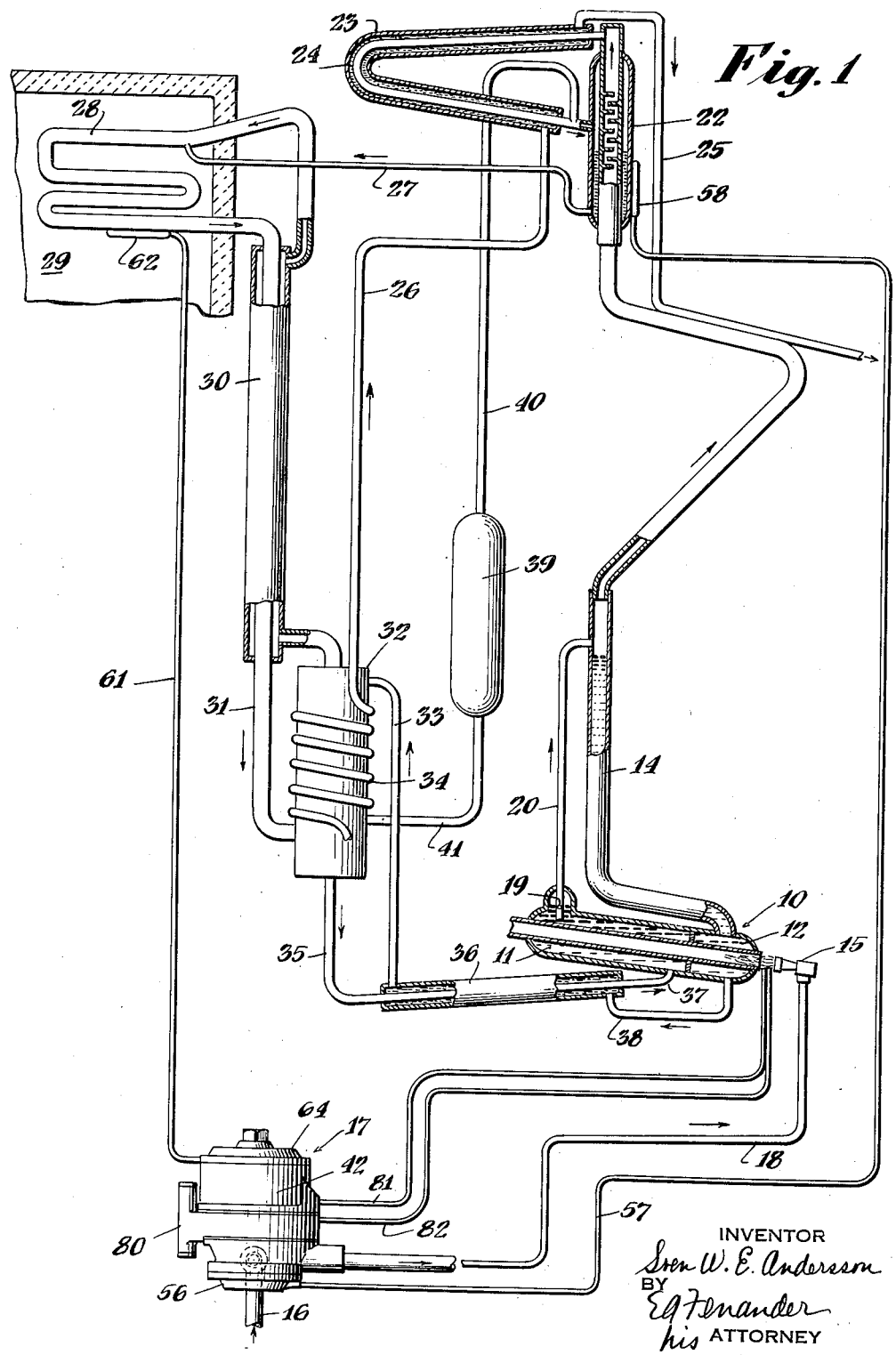

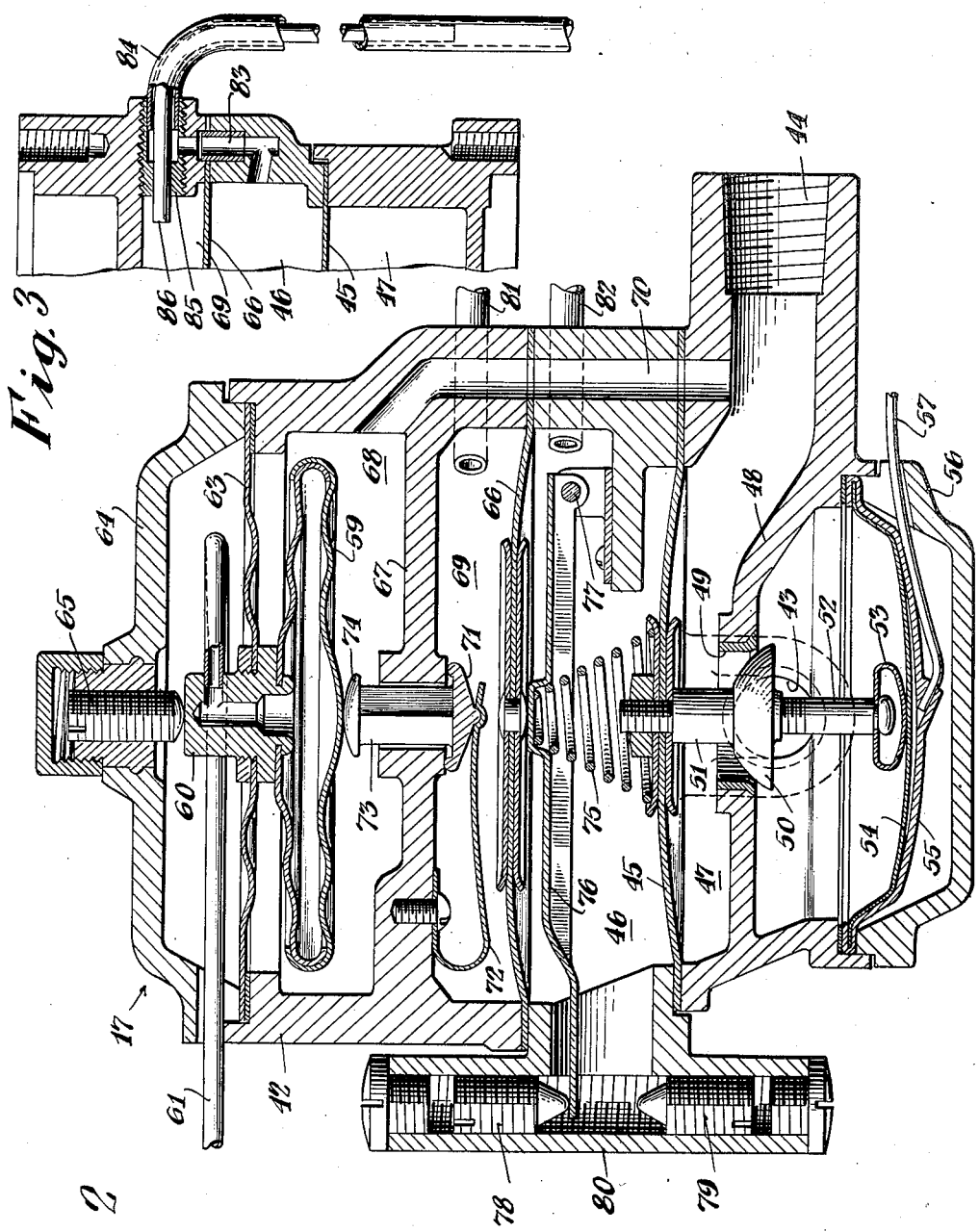

Patented Oct. 8, 1940

2,217,303

UNITED STATES PATENT OFFICE 2,217,303

TEMPERATURE CONTROL VALVE

Sven W. E. Andersson, Evansville, Ind., assignor to Servel, Inc., New York, N. Y., a corporation of Delaware Application May 4, 1937, Serial No. 140,611

3 Claims. (Cl. 236—80)

My invention relates to refrigeration, and more particularly to control of refrigeration apparatus.

It is an object of my invention to provide an improved device for controlling the heat supply of refrigeration apparatus operated by heat, the device being of the type in which a valve is connected to a movable diaphragm which is moved in response to temperature or other operating condition to control the flow of fuel. More particularly, it is an object to provide such a device in which gas under pressure constantly exerts a force on one side of the movable diaphragm, and in response to temperature or other operating condition, exerts a force on the other side of the diaphragm through the agency of a regulating or load spring. Another object is to provide such a device in which the maximum and minimum tension of the regulating or load spring may be adjusted to control the maximum and minimum flow of fuel.

The above and other objects and advantages of the invention will be more fully understood from the following description taken in conjunction with the accompanying drawings forming a part of this specification, and of which Fig. 1 diagrammatically illustrates refrigeration apparatus of an absorption type provided with a control device embodying the invention; Fig. 2 is an enlarged vertical sectional view of the control device shown in Fig. 1; and Fig. 3 is a fragmentary sectional view illustrating a modification of the device.

Referring to Fig. 1, I have shown my improved control device in connection with an absorption refrigeration system of a uniform pressure type, generally as described in Patent No. 1,609,334 to von Platen and Munters, which contains an auxiliary pressure equalizing gas. The system includes a generator 10 having a rear chamber 11 and a forward chamber 12 communicating with an upward extending standpipe or separator 14. The generator contains a body of absorption liquid, such as water, having a suitable refrigerant, such as ammonia, in solution therein. The generator 10 is heated by a gas burner 15 to which a suitable combustible gas is delivered through conduit 16, control device 17 which will be described hereinafter, and conduit 18.

The heat applied to the generator causes ammonia vapor and absorption liquid in chamber 11 to pass through an opening 19 in the lower end of a small vertical conduit 20 which constitutes a vapor-lift and conducts ammonia vapor and absorption liquid to the upper part of standpipe 14. The liberated ammonia vapor entering standpipe 14 from conduit 20, as well as the ammonia vapor expelled from solution in standpipe 14 and chamber 12, flows upward through a liquid cooled rectifier 22 into a condenser 23 which is diagrammatically shown in the form of a looped coil. The condenser 23 is provided with a jacket 24 which is connected to conduits 25 and 26 and through which a cooling medium, such as water, is circulated to effect condensation of refrigerant vapor. The liquefied refrigerant flows from condenser 23 to the rectifier 22 whereby water vapor which may accompany the ammonia vapor is condensed and drains back to the generator.

The liquefied ammonia flows from rectifier 22 through conduit 27 into the upper end of an evaporator or cooling element 28 which is disposed in a thermally insulated storage space 29. An inert gas, such as hydrogen, enters the upper end of the evaporator 28 from the outer passage of a gas heat exchanger 30. The liquid ammonia evaporates in the evaporator 28 and diffuses into the inert gas to produce a refrigerating effect, and the resulting rich gas mixture of ammonia and hydrogen flows from the evaporator through the inner passage of the gas heat exchanger 30 and conduit 31 into the lower end of an absorber 32. The ammonia vapor in the rich gas mixture is absorbed into weak absorption liquid which enters the upper part of the absorber through a conduit 33, and the heat liberated with such absorption of ammonia vapor is transferred to the cooling medium, such as water, which flows upward within a coil 34 which is disposed about the absorber and is connected at its upper end to the conduit 26.

The hydrogen, which is practically insoluble and weak in ammonia, flows upward from absorber 32 through the outer passage of the gas heat exchanger 30 and into the upper end of the evaporator 28; and the enriched absorption liquid is conducted from the absorber 32 through a conduit 35, liquid heat exchanger 36, and conduit 37 into chamber 11 of the generator 10. The weakened absorption liquid from which ammonia has been expelled is conducted from chamber 12 through conduit 38, liquid heat exchanger 36 and conduit 33 into the upper part of absorber 32.

A pressure vessel 39 is connected by conduits 40 and 41 to the lower part of condenser 23 and to the gas circuit, as at the absorber 32, for example, so that any hydrogen which may pass into the condenser can flow into the gas circuit. Ammonia vapor not liquefied in condenser 23 will flow through conduit 40 to displace hydrogen in vessel 39 and force such hydrogen through conduit 41 into the gas circuit, thereby raising the total pressure in the system so that an adequate condensing pressure is obtained to insure condensation of ammonia vapor in condenser 23.

In accordance with the invention, the flow of gas to the burner 15 is controlled by the control device 17. Referring to Fig. 2, the control device 17 includes a casing 42 having inlet and outlet openings 43 and 44 to which are connected the conduits 16 and 18, respectively. A resilient diaphragm 45 is secured at its peripheral edge between the intermediate and lower parts of casing 42 to form chambers 46 and 47, and in the lower chamber 47 a partition 48 is provided having an opening to form a main passage for flow of gas from the inlet 43 to the outlet 44. To the partition 48 at the opening therein is secured a short sleeve member 49 which serves as a seat for a valve 50 having a stem 51 secured to the diaphragm 45. To the valve 50 is threadedly secured a stud 52 at the lower end of which is fastened a removable snap-on button or spring clamp 53.

The clamp 53 bears against a thermal element arranged at the lower end of the casing. This thermal element includes a resilient diaphragm 54 arranged in spaced relation with a plate 55. The plate 55 is secured between the lower end of casing 42 and a cover plate 56. At a central opening in plate 55 is secured one end of a capillary tube 57 which extends through an opening in the cover plate 56 and is connected at its other end to a bulb 58 in thermal contact with the liquid cooled rectifier 22, as shown in Fig. 1.

The resilient diaphragm 54, plate 55, tube 57 and bulb 58 are filled with a suitable fluid, and constitute an expansible fluid thermostat for controlling valve 50. If for any reason the temperature of the liquid cooled rectifier 22 becomes relatively high, due to failure of the cooling medium to circulate through the jacket 24 of the condenser 23, for example, the expansible fluid thermostat becomes effective to close the valve 50 and completely shut off the supply of fuel to the burner 15.

In the upper part of casing 42 is arranged a thermal element 59 which is in the form of an expansible diaphragm. The expansible diaphragm is secured to and in open communication with a hollow hub member 60. To the member 60 is connected one end of a capillary tube 61 which is connected at its other end to a bulb 62 in thermal contact with the cooling element 28, as shown in Fig. 1. The hub member 60 is mounted on a resilient diaphragm 63 secured between the upper end of casing 42 and a cover plate 64 having an opening through which the tube 61 passes. The position of the resilient diaphragm 63 may be adjusted by a screw 65 which is provided on the cover plate 64 and bears against the hub member 60. The expansible diaphragm 59, hub member 60, tube 61, and bulb 62 are filled with a suitable fluid, and constitute an expansible fluid thermostat for effecting control of valve 50, as will be described hereinafter.

Between the intermediate and upper parts of casing 42 is secured a flexible diaphragm 66 which is somewhat larger in diameter than the diaphragm 45. The upper part of casing 42 is provided with a partition 67 which, with the diaphragms 63 and 66, forms the chambers 68 and 69. The casing 42 is provided with a passage 70 to permit gas to enter chamber 68 from the chamber 47 which forms part of the main gas passage. The flow of gas from chamber 68 through an opening in partition 67 and into chamber 69 is controlled by a valve 71. The valve 71 is urged to its closed position by a resilient leaf spring 72 secured to the underside of partition 67. The valve 71 is provided with a triangular-shaped stem 73 having an enlarged head 74 which is adapted to bear against the expansible diaphragm 59.

When the valve 71 is in an open position and gas flows into chamber 69, a force is exerted on the upper side of diaphragm 66 to cause downward movement of this diaphragm. This downward movement of diaphragm 66 is transmitted to valve 50 through the agency of a regulating or load spring 75 which is disposed between the diaphragm 45 and a lever 76. The lever 76 is pivoted at 77 within chamber 46 and an intermediate raised portion thereof bears against the underside of diaphragm 66. The outer free end of lever 76 extends through an opening in the intermediate part of casing 42, and the extent of upward and downward movement of the lever is limited by screws 78 and 79. The screws 78 and 79 are movable and adjustable within a boss 80 which may be formed integrally with the intermediate part of the casing.

The casing 42 is provided with two openings communicating with the chambers 69 and 46, and at these openings are secured small conduits 81 and 82, respectively, which may terminate in the vicinity of the burner 15, as shown in Fig. 1. The conduit 81 serves as a vent for conducting gas from chamber 69 to the vicinity of the burner. Although chamber 46 may be open to the atmosphere, it is preferably sealed and the vent conduit 82 provided to conduct gas to the vicinity of the burner in the event of diaphragm failure.

The operation of the control device just described is substantially as follows: When the cooling element 28 is substantially at the desired low temperature, the expansible diaphragm 59 will be contracted sufficiently to permit the leaf spring 72 to urge valve 71 to its closed position. Under these conditions chambers 69 and 46 are at atmospheric pressure with the regulating spring extended, and the diaphragm 66 and lever 76 are raised upward as far as the upper adjusting screw 78 will permit. With lever 76 contacting the adjusting screw 78, the valve 50 is in its closed position and partially open so that gas flows to burner 15 at a reduced rate and only heat of liquid is supplied to the refrigerant. The refrigerant is therefore heated to a temperature below its vaporization temperature, and, since refrigerant is not expelled out of solution from absorption liquid, the refrigerating effect produced by cooling element 28 is reduced.

When the cooling element 28 tends to rise above the desired low temperature, the expansible diaphragm 59 will expand due to the increase in volume of fluid in the expansible fluid thermostat. With expansion of the diaphragm 59, valve 71 is moved to its open position against the tension of leaf spring 72 and gas is diverted from the main passage and flows through passage 70, chamber 68 and the opening in partition 67 into the chamber 69. With gas under pressure in chamber 69 the force exerted on the upper side of diaphragm 66 will be increased, and, due to the larger diameter of this diaphragm, sufficient force will be exerted on lever 76 to compress and increase the tension of regulating spring 75. This increases the force exerted on the upper side of diaphragm 45 so that it will move downward against the force exerted on the underside of the diaphragm by gas under pressure in chamber 47. When lever 76 contacts the lower adjusting screw 79, the tension of spring 75 is at a maximum and the force exerted on the upper side of diaphragm 45 is such that the valve 50 is in its full open position.

With valve 50 in its full open position, gas flows to burner 15 at such a rate that refrigerant is vaporized and expelled out of solution from absorption liquid, and the refrigerating system operates in the manner described above to produce a refrigerating effect in the storage space 29. With the valve 50 in its full open position the burner 15 will be operating at what may be termed a "maximum flame," and in its closed position, with gas flowing at a reduced rate to burner 15, the burner will be operating at what may be termed a "minimum flame."

In addition to controlling the flow of gas to burner 15 in response to temperature, as just described, the control device is also arranged to regulate the pressure of gas delivered to the burner. When the gas pressure in chamber 47 increases the force exerted on the underside of diaphragm 45 will be increased, thereby causing the diaphragm to move upward against the tension of regulating spring 75. This will move the valve 15 toward its closed position to reduce the flow of gas to burner 15. With less gas supplied to chamber 47 the gas pressure therein decreases, thereby permitting the regulating spring to move the valve 50 back to its original position.

When the gas pressure in chamber 47 decreases the force exerted on the underside of diaphragm 45 will be decreased, whereby the regulating spring 75 becomes effective to move the valve 50 downward to increase the flow of gas into chamber 47. With more gas supplied to chamber 47 the gas pressure therein increases, thereby causing the diaphragm 45 to move upward against the tension of regulating spring 75 and move valve 50 back to its original position. In this manner the pressure of gas in chamber 47 is maintained substantially constant so that gas is delivered at a substantially constant pressure to the burner 15.

After the valve 71 is moved to its closed position during operation of the device, the pressures in chambers 46 and 69 are soon equalized and at atmospheric pressure by venting the gas in chamber 69 through tube 81. The tube 81 is sufficiently small so that the gas pressure will increase sufficiently in chamber 69 to effect the above described operation when valve 71 is moved to its open position; that is, gas will flow into chamber 69 at a considerably faster rate than the flow of gas from the chamber through conduit 81. Instead of providing separate conduits 81 and 82, the upper and intermediate parts of the casing may be formed with a passage 83, as shown in the modification illustrated in Fig. 3. The passage 83 communicates with chamber 46 and to the upper end thereof is secured a tube 84. The passage 83 is sealed from chamber 69 by a plug 85, and a tube 86 extends through the plug and communicates with the chamber 69. The tube 86 is smaller in diameter than tube 84 and extends into the latter for a short distance. With this arrangement it is only necessary to provide a single vent tube which may discharge gas into the atmosphere or conduct gas to the vicinity of the burner 15.

It will now be understood that a control device has been provided in which the flow of a relatively large quantity of gas to the burner 15 may be controlled by a thermal element which permits a small quantity of gas to be diverted, so that a force may be exerted on the main valve diaphragm to control the operating position of the valve. With only a small quantity of gas utilized to effect control of the main valve, a control device is provided which is relatively small and sensitive in operation. By providing the regulating spring 75, lever 76, and maximum and minimum adjusting screws 78 and 79 which are adjustable from the exterior of the casing 42, the control device may be utilized to perform many functions which otherwise would require several independent control devices connected in the fuel supply line of the burner.

While a particular embodiment of the improved control device has been shown and described, I do not wish to be limited to the particular arrangement set forth, and I intend in the following claims to cover all modifications which do not depart from the spirit and scope of the invention.

What is claimed is:

1. A device for controlling flow of fluid fuel to a burner including a diaphragm operated valve, structure whereby both sides of said diaphragm are subjected to pressure of fluid, mechanism including an element responsive to temperature or pressure and a movable member to vary the differential of fluid pressures on said diaphragm to operate said valve, and stop means in the path of movement of said movable member for limiting movement of said valve effected by differential movement of said fluid pressures, said mechanism and said stop means being so constructed and arranged that movement of said valve is limited without interfering with movement of said element.

2. A control device for a burner including a main valve for controlling flow of fluid fuel to the burner, a fluid tight chamber within which said valve is disposed and having inlet and outlet openings for fluid fuel flowing to the burner, said chamber having a flexible wall portion operatively connected to said main valve and operated by pressure of fluid fuel on the discharge side of said main valve to move said main valve toward its closed position, a control chamber having a movable wall portion, said control chamber having an inlet and an outlet for fluid, a control valve for controlling flow of fluid to said control chamber, means operative responsive to temperature or pressure for operating said control valve to vary flow of fluid to said control chamber and hence the pressure of fluid on said movable wall portion, mechanism operatively associating said movable wall portion and said flexible wall portion for transmitting fluid pressure from said movable wall portion to said flexible wall portion to move said main valve toward its open position in opposition to pressure of fluid fuel on said flexible wall portion, and stop means associated with said mechanism for limiting closing and opening movement of said main valve, said mechanism and said stop means being so constructed and arranged that closing and opening movement of said main valve is limited by said stop means without interfering with movement of said temperature or pressure responsive means.

3. A control device for a burner including a main valve for controlling flow of fluid fuel to the burner, a fluid chamber within which said main valve is disposed and having inlet and outlet openings for fluid fuel flowing to the burner, said chamber having a flexible wall portion operatively connected to said main valve and operated by pressure of fluid fuel on the discharge side of said main valve to move said valve toward its closed position, a control chamber having a movable wall portion, said control chamber having an inlet and outlet for fluid fuel, a control valve for controlling flow of fluid to said control chamber, means operative responsive to temperature or pressure for operating said control valve to vary flow of fluid to said control chamber and hence the pressure of fluid on said movable wall portion, mechanism including a movable member operatively associating said movable wall portion and said flexible wall portion for transmitting fluid from said movable wall portion to said flexible wall portion to move said main valve toward its open position in opposition to pressure of fluid fuel on said flexible wall portion, and stop means in the path of movement of said movable member for limiting closing and opening movement of said valve effected by differential of fluid pressures on said flexible wall portion, said stop means and said mechanism being so constructed and arranged that closing and opening movement of said main valve is limited by said stop means without interfering with movement of said temperature or pressure responsive means.

SVEN W. E. ANDERSSON.